(12) United States Patent
Wang et al.

(10) Patent No.: US 8,031,500 B2
(45) Date of Patent: Oct. 4, 2011

(54) BRIDGELESS POWER FACTOR CORRECTOR WITH LOGIC CONTROL

(75) Inventors: Chih-Liang Wang, Keelung (TW);
Ching-Sheng Yu, Wugu Township, Taipei County (TW)

(73) Assignee: GlacialTech., Inc., Taipei (TW)

( * ) Notice: Subject to any disclaimer, the term of this patent is extended or adjusted under 35 U.S.C. 154(b) by 0 days.

(21) Appl. No.: 12/776,687

(22) Filed: May 10, 2010

(65) Prior Publication Data

US 2010/0289461 A1  Nov. 18, 2010

(30) Foreign Application Priority Data

May 15, 2009 (TW) .............................. 98116289 A

(51) Int. Cl.
*H02M 7/217* (2006.01)
*H02M 5/42* (2006.01)
(52) U.S. Cl. ......................................... 363/127; 363/89
(58) Field of Classification Search .................... 363/84, 363/89, 123, 125, 127
See application file for complete search history.

(56) References Cited

U.S. PATENT DOCUMENTS

| | | | |
|---|---|---|---|
| 3,975,718 A * | 8/1976 | Goser | 365/181 |
| 2007/0279955 A1* | 12/2007 | Liu et al. | 363/125 |
| 2008/0002444 A1* | 1/2008 | Shekhawat et al. | 363/127 |
| 2009/0168476 A1* | 7/2009 | Moon et al. | 363/89 |
| 2010/0259240 A1* | 10/2010 | Cuk | 323/299 |

* cited by examiner

*Primary Examiner* — Adolf Berhane
*Assistant Examiner* — Jeffrey Gblende
(74) *Attorney, Agent, or Firm* — Muncy, Geissler, Olds & Lowe, PLLC

(57) ABSTRACT

The present invention discloses a bridgeless active power factor corrector with a logic control comprising a high frequency switch controller, a boost inductor, an output filtering capacitor, two boost transistor modules, two boost diodes, two AC input voltage polarity detectors, and two low frequency switch drivers. With a coupling signal, the two AC input voltage polarity detectors respectively control the two low frequency switch drivers in conjunction with the high frequency switch controller to drive the two boost transistor modules with a logic control so that the inductor current releasing electric energy from the boost inductor can flow through the channels of the two boost transistor modules to effectively reduce the body diode conduction loss.

9 Claims, 4 Drawing Sheets

BRIDGELESS POWER FACTOR CORRECTOR WITH LOGIC CONTROL

BACKGROUND OF THE INVENTION

1. Field of the Invention

The present invention is related to a bridgeless active power factor corrector, and more particularly to a bridgeless active power factor corrector with a logic control.

2. Description of the Prior Art

Causing the AC input current to be in phase with the AC input voltage, a resistor consumes real power. On the contrary, an inductor or a capacitor stores imaginary power because of causing the AC input current to be in quadrature with the AC input voltage. More simply, only real power does a resistive load consume. Not only does a non-resistive load consume real power but it also stores imaginary power. The imaginary power leads to an added AC input current flowing through power lines and an increased line loss shouldered by power companies. Therefore, it is strongly requested by power companies the power factor (PF) of large electrical equipments be strictly corrected to an acceptable value. Generally speaking, to correct the power factor is to align the AC input current to be in phase with the AC input voltage. In switching power supplies drawing more than 75 W from power grids, an Active Power Factor Corrector (APFC) is nearly an essential device reforming the AC input current to be both in phase and in shape with the AC input voltage so as to meet a stringent requirement for a power factor higher than 0.95.

It is shown in FIG. 1a prior bridge-based APFC comprising a bridge rectifier 10 and a conventional APFC 11. A bridge rectifier 10, an AC/DC Conversion (ADC) device, rectifies an AC sinusoidal input voltage across a first $V_{i1}$ and a second input voltage terminal $V_{i2}$ into a DC sinusoidal output voltage on an input filtering capacitor $C_{11}$. A conventional APFC 11 reforms the AC input current to be both in phase and in shape with the AC input voltage as well as boosts a lower DC sinusoidal input voltage on an input filtering capacitor $C_{11}$ to a higher DC constant output voltage on an output filtering capacitor $C_{12}$.

To conveniently explain how electric energy is stored to and released from a boost inductor, it is assumed throughout this text the horizontal and the vertical axis in a Cartesian coordinate system (I-V coordinate system) respectively stand for the inductor current and voltage on the boost inductor. The boost inductor $L_{11}$ operates in either the first or the fourth quadrant because the inductor current is always positive while the inductor voltage is either positive to store or negative to release energy. When the high frequency switch controller 12 switches on the boost transistor $Q_{11}$, the inductor current, flowing through the input filtering capacitor $C_{11}$, the boost inductor $L_{11}$, and the boost transistor $Q_{11}$, stores energy to the boost inductor $L_{11}$, operating in the first quadrant. When the high frequency switch controller 12 switches off the boost transistor $Q_{11}$, the inductor current, flowing through the input filtering capacitor $C_{11}$, the boost inductor $L_{11}$, the boost diode $D_{11}$, and the output filtering capacitor $C_{12}$, releases energy from the boost inductor $L_{11}$, operating in the fourth quadrant. Not only do the high frequency switch controller 12 and the conventional APFC 11 reform the AC input current to correct the power factor but they also regulate the DC output voltage to supply a DC/DC converter so that a complex system looks like a simple resistor in the eyes of power grids.

Please take a closer look at the bridge rectifier 10. In order to set up a polarity reference for the following description to cite, a positive/negative half period is defined as the potential of $V_{i1}$ is higher/lower than that of $V_{i2}$. During the positive/negative half period, the upper left/right and the lower right/left diode rectifiers conduct the AC input current. Therefore, the prior bridge-based APFC, barely acceptable in a low to medium power range, suffers from a diode rectifier conduction loss seriously hindering power engineers from designing high-power, high-efficiency power supplies. As the power level grows with days, the bridge rectifier also begins becoming a hot potato very difficult to deal with. A prior bridgeless APFC needing no bridge rectifier for ADC breaks through such a bottleneck.

It is shown in FIG. 2 a prior bridgeless APFC implicitly making use of the intrinsic body diode internally oriented from the source to the drain terminal of a boost transistor as well as concurrently implementing both ADC and APFC without the need for a bridge rectifier. The core(s) and winding(s) of a boost inductor $L_{21}$ can be lumped together either on one path between the first input voltage terminal $V_{i1}$ and a first connecting node $V_1$ or on another path between the second input voltage terminal $V_{i2}$ and a second connecting node $V_2$ or they can be distributed apart over both paths. An output filtering capacitor $C_{21}$ is connected between the output $V_o$ and the reference voltage terminal $V_{ref}$. Boost diodes $D_{21}$ and $D_{22}$ implemented with Silicon Carbide Schottky Diodes (SCSD) as well as boost transistors $Q_{21}$ and $Q_{22}$ implemented with N-channel Metal Oxide Semiconductor Field Effect Transistors (NMOSFET) are connected in a bridge configuration placed between the boost inductor $L_{21}$ and the output filtering capacitor $C_{21}$. A high frequency switch controller 22 simultaneously switches on/off the boost transistors $Q_{21}$ and $Q_{22}$.

During the positive/negative half period, the boost inductor $L_{21}$ operates in either the first/third or the fourth/second quadrant because the inductor current is always positive/negative while the inductor voltage is either positive/negative to store or negative/positive to release energy. When the high frequency switch controller 22 simultaneously switches on the boost transistors $Q_{21}$ and $Q_{22}$, the inductor current, flowing through the input voltage terminal $V_{i1}/V_{i2}$, the boost inductor $L_{21}$, the channels of the boost transistors $Q_{21}$, $Q_{22}$, and the input voltage terminal $V_{i2}/V_{i1}$, stores energy to the boost inductor $L_{21}$, operating in the first/third quadrant. When the high frequency switch controller 22 simultaneously switches off the boost transistors $Q_{21}$ and $Q_{22}$, the inductor current, flowing through the input voltage terminal $V_{i1}/V_{i2}$, the boost inductor $L_{21}$, the boost diode $D_{21}/D_{22}$, the output filtering capacitor $C_{21}$, the body diode of the boost transistor $Q_{22}/Q_{21}$, and the input voltage terminal $V_{i2}/V_{i1}$, releases energy from the boost inductor $L_{21}$, operating in the fourth/second quadrant.

In the prior bridge-based APFC, through two rectifier diodes flows the AC input current rectified by a bridge rectifier whether storing/releasing energy to/from the boost inductor. In the prior bridgeless APFC, through one boost and one body diode flows the AC input current not rectified by a bridge rectifier when releasing energy from the boost inductor. Needing no bridge rectifier for ADC, the prior bridgeless APFC has a higher efficiency than the prior bridge-based APFC does. However, it is still a fly in the ointment the inductor/AC input current in the prior bridgeless APFC releases energy via the body diodes, causing a body diode conduction loss. Using the channels of the boost transistors to release energy, the present invention proposes a new topology of bridgeless APFC to reduce the body diode conduction loss.

SUMMARY OF THE INVENTION

The present invention is directed to a bridgeless APFC with logic control, comprising a first and a second input terminal, a first and a second connecting node, an output voltage terminal, a reference voltage terminal, a boost inductor, an output filtering capacitor, a first and a second boost diode, a first and a second boost transistor module, a high frequency switch controller, a first and a second low frequency switch driver, a first and a second AC input voltage polarity detector.

The core(s) and winding(s) of the boost inductor can be lumped together either on one path between the first input voltage terminal and the first connecting node or on another path between the second input voltage terminal and the second connecting node or they can be distributed apart over both paths. The output filtering capacitor is connected between the output and the reference voltage terminal. Of the first and the second boost diode, the anodes are respectively connected to the first and the second connecting node; the cathodes are commonly connected to the output voltage terminal.

Both the first and the second boost transistor module include a first and a second input terminal as well as a first and a second output terminal. Of the first and the second boost transistor module, the first input terminals are respectively connected to the first and the second low frequency switch driver; the second input terminals are commonly connected to the high frequency switch controller; the first output terminals are respectively connected to the first and the second connecting node; the second output terminals are commonly connected to the reference voltage terminal.

Both the first and the second AC input voltage polarity detector connected to the two AC input voltage terminals respectively detect the positive and the negative half period during an alternating period as well as respectively control the first and the second low frequency switch driver with a coupling signal. The coupling signal may be but not limited to an optic coupling, a magnetic coupling, and so on. Both the first and the second low frequency switch driver in conjunction with the high frequency switch controller respectively drive the first and the second boost transistor module with a logic control. The logic control may be but not limited to an OR logic control, an NAND logic control, and so on.

Of the first and the second boost transistor module, the channels lie between the first and the second output terminal. During the positive/negative half period, the second/first low frequency switch driver holds on the channel of the second/first boost transistor module while the high frequency switch controller switches off the channel of the first/second boost transistor module so that the inductor current releasing energy from the boost inductor can flow through the channel of the second/first boost transistor module to reduce the body diode conduction loss. In brief, the channel of the first and the second boost transistor module respectively holds on during the negative and the positive half period.

The advantages, features, objectives, and technologies of the present invention will become more apparent from the following description in conjunction with the accompanying drawings, wherein certain embodiments of the present invention are set forth by way of illustration and examples.

DESCRIPTION OF THE PREFERRED EMBODIMENT

Figure 1:
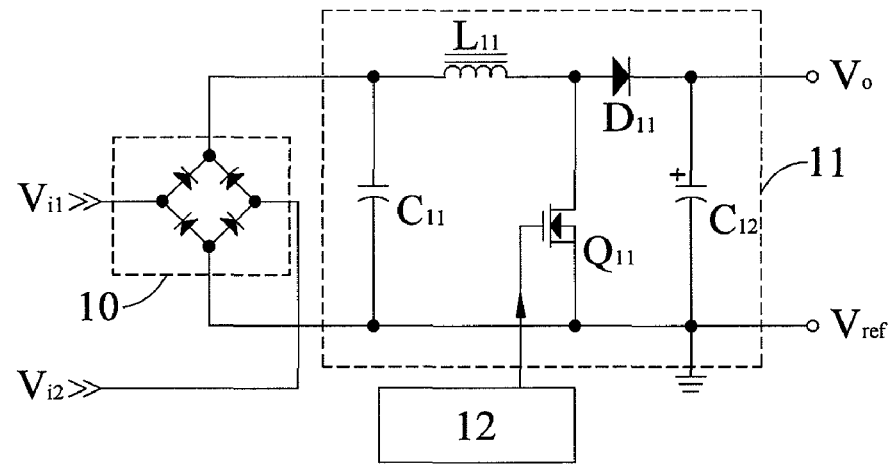
FIG. 1 illustrates a circuit diagram of a prior bridge-based APFC comprising a bridge rectifier and a conventional APFC.
Figure 2:
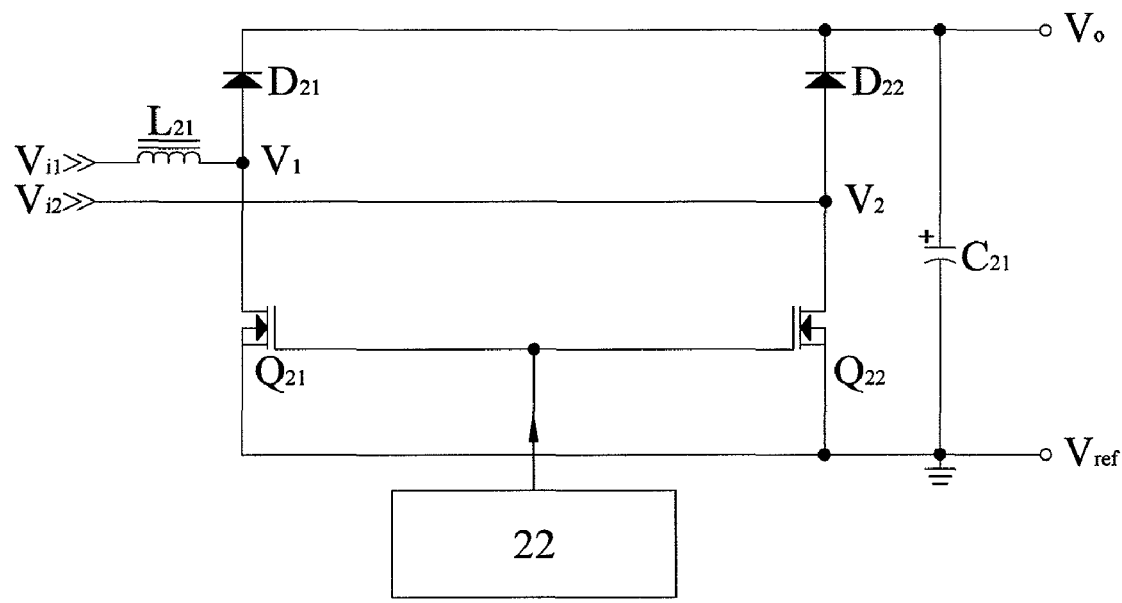
FIG. 2 illustrates a circuit diagram of a prior bridgeless APFC invoking the body diodes of the boost transistors to release the inductor energy.
Figure 3:
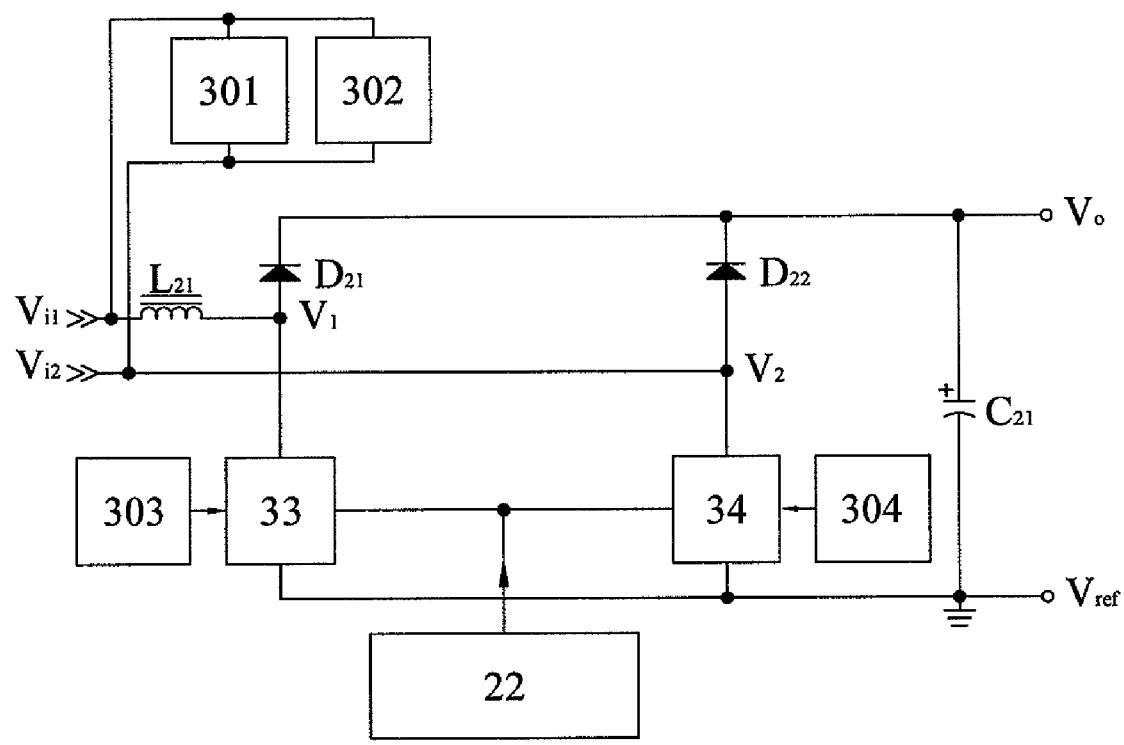
FIG. 3 shows a block diagram of the present invention illustrating a circuit topology of a bridgeless APFC with logic control.

FIG. 3 shows a block diagram of the present invention illustrating a circuit topology of a bridgeless APFC with logic control comprising a first $V_{i1}$ and a second input terminal $V_{i2}$, a first $V_1$ and a second connecting node $V_2$, an output voltage terminal $V_o$, a reference voltage terminal $V_{ref}$, a boost inductor $L_{21}$, an output filtering capacitor $C_{21}$, a first $D_{21}$ and a second boost diode $D_{22}$, a first 33 and a second boost transistor module 34, a high frequency switch controller 22, a first 303 and a second low frequency switch driver 304, a first 301 and a second AC input voltage polarity detector 302.

The core(s) and winding(s) of the boost inductor $L_{21}$ can be lumped together either on one path between the first input voltage terminal $V_{i1}$ and the first connecting node $V_1$ or on another path between the second input voltage terminal $V_{i2}$ and the second connecting node $V_2$ or they can be distributed apart over both paths. The output filtering capacitor $C_{21}$ is connected between the output $V_o$ and the reference voltage terminal $V_{ref}$. Of the first $D_{21}$ and the second boost diode $D_{22}$, the anodes are respectively connected to the first $V_1$ and the second connecting node $V_2$; the cathodes are commonly connected to the output voltage terminal $V_o$.

Both the first 33 and the second boost transistor module 34 include a first and a second input terminal as well as a first and a second output terminal. Of the first and the second boost transistor module, the first input terminals are respectively connected to the first 303 and the second low frequency switch driver 304; the second input terminals are commonly connected to the high frequency switch controller 22; the first output terminals are respectively connected to the first $V_1$ and the second connecting node $V_2$; the second output terminals are commonly connected to the reference voltage terminal $V_{ref}$.

Both the first 301 and the second AC input voltage polarity detector 302 connected to the two AC input voltage terminals $V_{i1}$ and $V_{i2}$ respectively detect the positive and the negative half period during an alternating period as well as respectively control the first 303 and the second low frequency switch driver 304 with a coupling signal. The coupling signal may be but not limited to an optic coupling, a magnetic coupling, and so on. Both the first 303 and the second low frequency switch driver 304 in conjunction with the high frequency switch controller 22 respectively drive the first 33 and the second boost transistor module 34 with a logic control. The logic control may be but not limited to an OR logic control, an NAND logic control, and so on.

Of the first 33 and the second boost transistor module 34, the channels lie between the first and the second output terminal. During the positive/negative half period, the second/first low frequency switch driver 304/303 holds on the channel of the second/first boost transistor module 34/33 while the high frequency switch controller 22 switches off the channel of the first/second boost transistor module 33/34 so that the inductor current releasing energy from the boost inductor $L_{21}$ can flow through the channel of the second/first boost transistor module 34/33 to reduce the body diode conduction loss. In brief, the channel of the first 33 and the second boost transistor module 34 respectively holds on during the negative and the positive half period.

What follows explains how the first/second low frequency switch driver 303/304 in conjunction with the high frequency switch controller 22 respectively drive the first/second boost transistor module 33/34 with an OR/NAND logic gate having two input terminals and one output terminal. Dual to the explanation of Group 1 including 303 and 33, the explanation of Group 2 including 304 and 34 can be inferred by using duality and omitted without losing generality. Thus, suffice it to say Group 1 with an OR/NAND logic gate. First, consider Group 1 with an OR logic gate. Suppose $X_1$, the output signal of the first low frequency switch driver 303, is inputted to the first input terminal of the first boost transistor module 33 as the first input signal of the OR logic gate; $X_2$, the output signal of the high frequency switch controller 22, is inputted to the second input terminal of the first boost transistor module 33 as the second input signal of the OR logic gate; Y, the output signal of the OR logic gate, is outputted to the internal gate terminal of the first boost transistor module 33 as the internal driving signal of the first boost transistor module 33, then the relationship between $X_1$, $X_2$, and Y can be expressed as a logical disjunction $Y=X_1+X_2$ behaving according to a truth table listed in Table 1, wherein L and H respectively represent a low and a high logic level; Y is low if both $X_1$ and $X_2$ are low; Y is high if either $X_1$ or $X_2$ is high. In another word, Y effectively finds the maximum between $X_1$ and $X_2$.

During the positive half period, $X_1$ remains low ($X_1=L$); Y's level equals $X_2$'s level ($Y=X_1+X_2=L+X_2=X_2$). In other words, the first low frequency switch driver 303 remains silent; the high frequency switch controller 22 controls the channel of the first boost transistor module 33. During the negative half period, $X_1$ remains high ($X_1=H$), so does Y ($Y=X_1+X_2=H+X_2=H$); $X_2$ becomes void. That is to say, the first low frequency switch driver 303 holds on the channel of the first boost transistor module 33, whatever the high frequency switch controller 22 outputs.

TABLE 1

| Half period | $X_1$ | $X_2$ | $Y = X_1 + X_2$ |
|---|---|---|---|
| Positive | L | L | L |
|  | L | H | H |
| Negative | H | L | H |
|  | H | H | H |

Group 1 with an NAND logic gate is easily explained with the De Morgan's law: $Y=X_1+X_2=\overline{\overline{Y}}=\overline{\overline{X_1+X_2}}=\overline{\overline{X_1}\cdot\overline{X_2}}$ stating: "An OR logic gate is logically equivalent to two NOT logic gates followed by a NAND logic gate." Each of the two NOT gates has one input and one output terminal. This logic equivalence is listed in Table 2, wherein $X_1$ and $X_2$, the two input signals of the OR logic gate, are respectively inputted to the two input terminals of the two NOT logic gates as the two input signals of the two NOT logic gates; $\overline{X_1}$ and $\overline{X_2}$, the two output signals of the two NOT logic gates, are respectively inputted to the two input terminals of the NAND logic gate as the two input signals of the NAND logic gate; Y, the output signal of the NAND logic gate, is outputted to the internal gate terminal of the first boost transistor module 33 as the internal driving signal of the first boost transistor module 33. It is noted the NOT logic gate required for generating $\overline{X_1}$ can be omitted by swapping the first 301 and the second AC input voltage polarity detector 302 respectively corresponding to the first 303 and the second low frequency switch driver 304.

TABLE 2

| Half period | $X_1$ | $X_2$ | $\overline{X_1}$ | $\overline{X_2}$ | $Y = X_1 + X_2 = \overline{\overline{X_1}\cdot\overline{X_2}}$ |
|---|---|---|---|---|---|
| Positive | L | L | H | H | L |
|  | L | H | H | L | H |
| Negative | H | L | L | H | H |
|  | H | H | L | L | H |

Despite the logical equivalence, the embodiments implemented with an NAND logic control are more complex and more expensive than those implemented with an OR logic control. Therefore, only on preferred embodiments implemented with an OR logic control do the following paragraphs focus.

Figure 4A:
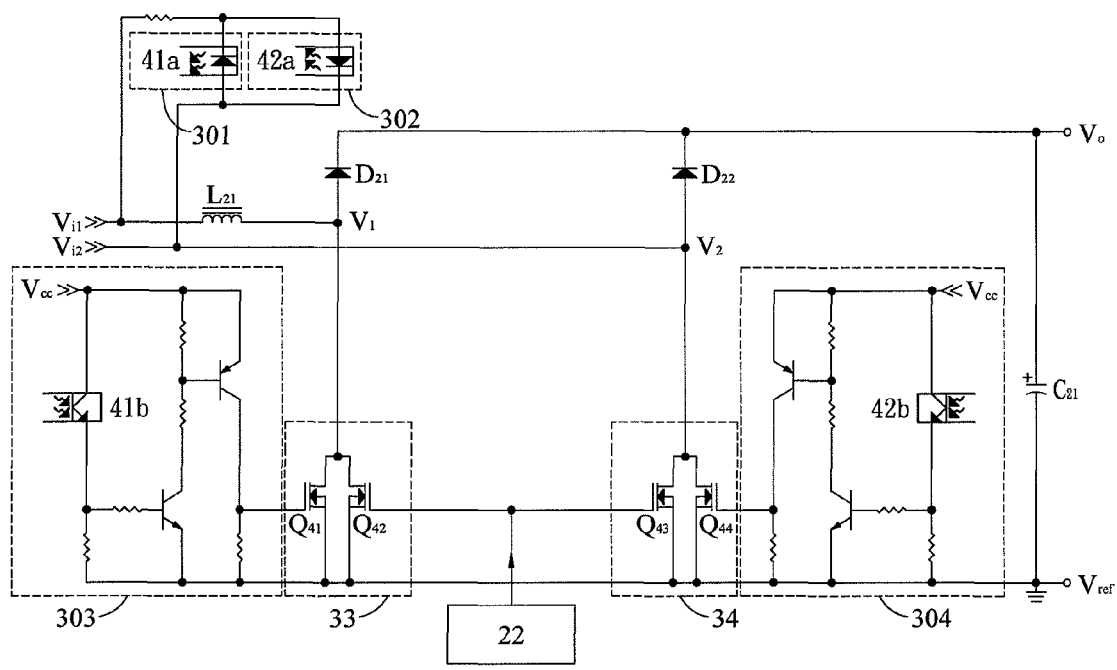
FIG. 4a shows one circuit diagram of the present invention illustrating one preferred embodiment of a bridgeless APFC with logic control.
Figure 4B:
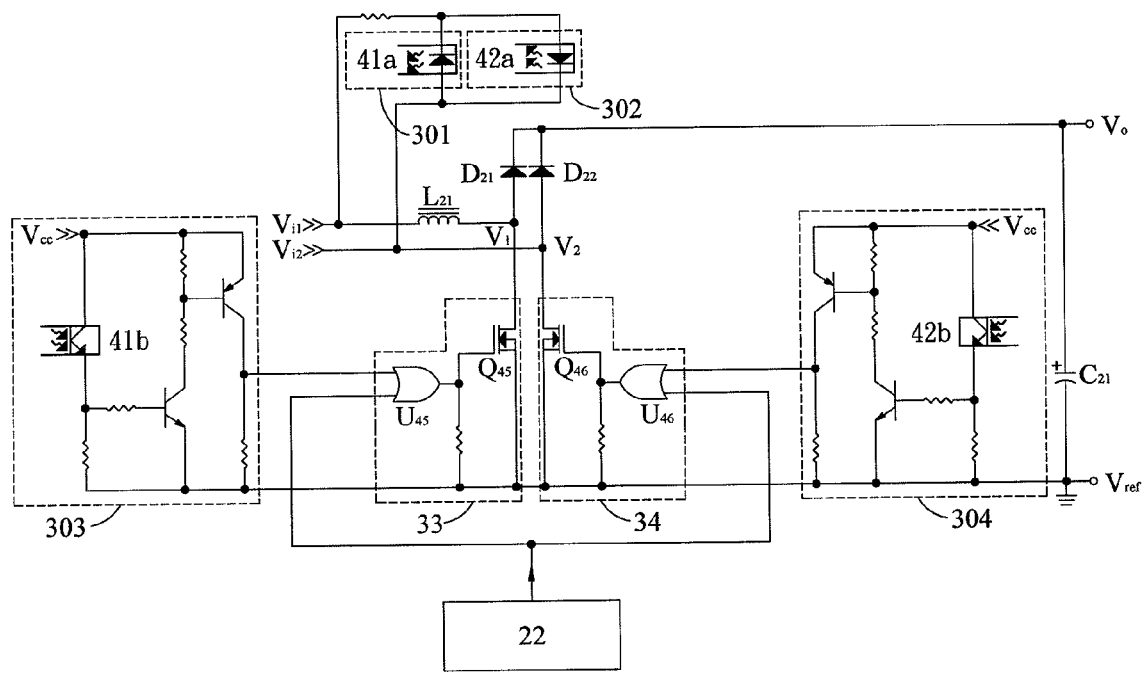
FIG. 4b shows another circuit diagram of the present invention illustrating another preferred embodiment of a bridgeless APFC with logic control.

FIG. 4a and FIG. 4b are two circuit diagrams illustrating two preferred embodiments of the bridgeless APFC with an OR logic control. In general, both the first 33 and the second boost transistor module 34 based on the present invention can be implemented with either a double-transistor illustrated in FIG. 4a or a single-transistor switch circuit illustrated in FIG. 4b. In FIG. 4a/FIG. 4b, both the first 33 and the second boost transistor module 34 are implemented with a double/single-transistor switch circuit. Of the first 33 and the second boost transistor module 34 in the other two embodiments with an OR logic control not shown in this specification, one is implemented with a double-transistor switch circuit and the other with a single-transistor switch circuit.

As shown in FIG. 4a, the double-transistor switch circuit implementing the first boost transistor module 33 includes a first $Q_{41}$ in parallel with a second NMOSFET $Q_{42}$ having two gate, two drain, and two source terminals, wherein the two gate terminals respectively act as the first and the second input terminal of the first boost transistor module 33; the two drain and the two source terminals respectively act as the first and the second output terminal of the first boost transistor module 33.

It is described as follows the operating principle of the preferred embodiment illustrated in FIG. 4a. Of Table 3, the long names listed in the left column are respectively referred to as the short names listed in the right column to simplify the following description. During the positive/negative half period, $Q_{44}/Q_{41}$ remains on and $Q_{41}/Q_{44}$ remains off. When controller 22 simultaneously switches on $Q_{42}$ and $Q_{43}$, the inductor current, flowing through $V_{i1}$, $L_{21}$, the channel of $Q_{42}/Q_{43}$, the channel of $Q_{43}/Q_{42}$ in parallel with the channel of $Q_{44}/Q_{41}$, and $V_{i2}$, stores energy to $L_{21}$, operating in the first/third quadrant. When controller 22 simultaneously switches off $Q_{42}$ and $Q_{43}$, the inductor current, flowing through $V_{i1}$, $L_{21}$, $D_{21}/D_{22}$, $C_{21}$, the channel of $Q_{44}/Q_{41}$, and $V_{i2}$, releases energy from $L_{21}$, operating in the fourth/second quadrant.

As shown in FIG. 4b, the single-transistor switch circuit implementing the first boost transistor module 33 includes an OR logic gate $U_{45}$ having a first input, a second input, and an output terminal as well as an NMOSFET $Q_{45}$ having a gate, a drain, and a source terminal.

TABLE 3

| Long names | Short names |
|---|---|
| the first input voltage terminal $V_{i1}$ | $V_{i1}$ |
| the second input voltage terminal $V_{i2}$ | $V_{i2}$ |
| the first NMOSFET transistor $Q_{41}$ of the first boost transistor module 33 | $Q_{41}$ |
| the second NMOSFET transistor $Q_{42}$ of the first boost transistor module 33 | $Q_{42}$ |

TABLE 3-continued

| Long names | Short names |
| --- | --- |
| the second NMOSFET transistor $Q_{43}$ of the second boost transistor module 34 | $Q_{43}$ |
| the first NMOS transistor $Q_{44}$ of the second boost transistor module 34 | $Q_{44}$ |
| the first boost diode $D_{21}$ | $D_{21}$ |
| the second boost diode $D_{22}$ | $D_{22}$ |
| the high frequency switch controller 22 | controller 22 |
| the boost inductor $L_{21}$ | $L_{21}$ |
| the output filtering capacitor $C_{21}$ | $C_{21}$ |

Of the OR logic gate $U_{45}$, the first and the second input terminal respectively act as the first and the second input terminal of the first boost transistor module 33. Of the NMOSFET $Q_{45}$, the drain and the source terminal respectively act as the first and the second output terminal of the first boost transistor module 33. The output terminal of the OR logic gate $U_{45}$ is internally connected to the gate terminal of the NMOSFET $Q_{45}$.

It is described as follows the operating principle of the preferred embodiment illustrated in FIG. 4b. Of Table 4, the long names listed in the left column are respectively referred to as the short names listed in the right column to simplify the following description.

TABLE 4

| Long names | Short names |
| --- | --- |
| the first input voltage terminal $V_{i1}$ | $V_{i1}$ |
| the second input voltage terminal $V_{i2}$ | $V_{i2}$ |
| the OR logic gate $U_{45}$ of the first boost transistor module 33 | $U_{45}$ |
| the NMOSFET $Q_{45}$ of the second boost transistor module 33 | $Q_{45}$ |
| the OR logic gate $U_{46}$ of the second boost transistor module 34 | $U_{46}$ |
| the NMOSFET $Q_{46}$ of the second boost transistor module 34 | $Q_{46}$ |
| the first boost diode $D_{21}$ | $D_{21}$ |
| the second boost diode $D_{22}$ | $D_{22}$ |
| the high frequency switch controller 22 | controller 22 |
| the boost inductor $L_{21}$ | $L_{21}$ |
| the output filtering capacitor $C_{21}$ | $C_{21}$ |

During the positive/negative half period, the first input signal of $U_{46}/U_{45}$ remains high and that of $U_{45}/U_{46}$ remains low. When the output signal of controller 22 goes high, both the output signal of $U_{45}$ and that of $U_{46}$ go high; both $Q_{45}$ and $Q_{46}$ are turned on; the inductor current, flowing through $V_{i1}$, $L_{21}$, the channels of $Q_{45}$, $Q_{46}$, and $V_{i2}$, stores energy to $L_{21}$, operating in the first/third quadrant. When the output signal of controller 22 goes low, the output signal of $U_{45}/U_{46}$ goes low and that of $U_{46}/U_{45}$ remains high; $Q_{45}/Q_{46}$ is turned off and $Q_{46}/Q_{45}$ remains on; the inductor current, flowing through $V_{i1}$, $L_{21}$, $D_{21}/D_{22}$, $C_{21}$, the channel of $Q_{46}/Q_{45}$, and $V_{i2}$, releases energy from $L_{21}$, operating in the fourth/second quadrant.

Here is a noticeable remark on the major difference between prior bridgeless APFC topologies and the present bridgeless APFC with logic control. Not through the body diodes having a higher conduction loss but through the channels having a lower conduction loss the boost transistor modules disclosed in the present invention release the electric energy stored on the boost inductor. Therefore, it is evident the bridgeless APFC with a logic control in the present invention can effectively reduce the body diode conduction loss in prior bridgeless APFC topologies.

According to an embodiment in the present invention, the first 301 and the second AC input voltage polarity detector 302 respectively control the first 303 and the second low frequency switch driver 304 with an optic coupling. Respectively during the negative and the positive half period, the first 41a and the second photodiode 42a in the first 301 and the second AC input voltage polarity detector 302 respectively emit two optic coupling signals respectively received by the first 41b and the second phototransistor 42b in the first 303 and the second low frequency switch driver 304. An optical coupling controller circuit is also used in the inventor's prior U.S. patent application (Ser. No. 12/569,298), and the structure characteristics and the operating principle of the first 301 and the second AC input voltage polarity detector 302 as well as the first 303 and the second low frequency switch driver 304 had been described in that patent application and are incorporated into the present invention. Finally, it should be emphasized the AC input voltage polarity detectors 301 and 302 as well as the low frequency switch drivers 303 and 304 can be implemented with either discrete components or integrated circuits.

While the present invention is susceptible to alternative forms and various modifications, specific examples thereof have been shown in the drawings and described in detail. Not limited to the particular forms disclosed herein, the present invention covers all the alternatives, equivalents, and modifications falling within the scope and spirit of the appended claims.

What is claimed is:

1. A bridgeless active power factor corrector (APFC) with a logic control comprising:
    a first connecting node, a second connecting node, an output voltage terminal, a reference voltage terminal, a boost inductor, and an output filtering capacitor, wherein the boost inductor is positioned between an external AC voltage source and the two connecting nodes, the output filtering capacitor is connected between the output and the reference voltage terminal;
    a first boost diode and a second boost diode, wherein anodes of the first and second diode are respectively connected to the first and the second connecting node and cathodes are commonly connected to the output voltage terminal;
    a first boost transistor module and a second boost transistor module, both comprising a first and a second input terminal as well as a first and a second output terminal, wherein the first output terminals are respectively connected to the first and the second connecting node, the second output terminals are commonly connected to the reference voltage terminal;
    a high frequency switch controller connected to the second input terminals of the first and the second boost transistor module;
    a first low frequency switch driver and a second low frequency switch driver respectively connected to the first input terminals of the first and the second boost transistor module; and
    a first and a second input voltage polarity detector, both connected to the external AC voltage source, for respectively detecting the positive and the negative half period during an alternating period as well as respectively controlling the first and the second low frequency switch driver, in conjunction with the high frequency switch controller to respectively drive the first boost transistor module and the second boost transistor module with a logic control.

2. A bridgeless APFC according to claim 1, wherein the first or the second boost transistor module are controlled with an OR/NAND logic control.

3. A bridgeless APFC to claim 1, wherein the first or the second boost transistor module is implemented with a double-transistor switch circuit, the double-transistor switch circuit comprises a first NMOSFET in parallel with a second NMOSFET, of which each has a gate, a drain and a source terminal, and the two gate terminals respectively act as the first and the second input terminals of the boost transistor modules; and the two drain terminals are commonly connected, the two source terminals are commonly connected and the connected drain terminal and the connected source terminal respectively act as the first output terminal and the second output terminal of the boost transistor module.

4. A bridgeless APFC according to claim 1, wherein the first boost transistor module or the second boost transistor module is implemented with a single-transistor switch circuit, the single-transistor switch circuit comprises an OR logic gate and an NMOSFET, and a first and a second input terminal of the OR logic gate respectively act as the first and the second input terminal of the boost transistor module, and a drain and a source terminal of the NMOSFET respectively act as the first and the second output terminal of the boost transistor module, and the output terminal of the OR logic gate is internally connected to the gate terminal of the NMOSFET.

5. A bridgeless APFC according to claim 1, wherein the first or the second AC input voltage polarity detector controls the first or the second low frequency switch driver with an optic coupling.

6. A bridgeless APFC according to claim 5, wherein the first or the second input voltage polarity detector comprises a photodiode to emit an optic coupling signal, and the first or the second low frequency switch driver respectively comprises a phototransistor to receive the optic coupling signal for driving the second low frequency switch driver.

7. A bridgeless APFC according to claim 6, wherein the first or the second low frequency switch driver further comprises:
   a DC constant voltage source, wherein the phototransistor has a collector and an emitter, and the collector is connected to the DC constant voltage source and the emitter is connected to the reference voltage terminal via a first resistor;
   a PNP bipolar junction transistor, wherein the PNP bipolar junction transistor has a base, a collector and an emitter, the base is connected to the DC constant voltage source via a second resistor; the collector is connected to the reference voltage terminal via a third resistor and the first input terminal of the boost transistor module; and the emitter is connected to the DC constant voltage source; and
   an NPN bipolar junction transistor, wherein the NPN bipolar junction transistor has a base, a collector, and an emitter, the base is connected to the emitter of the phototransistor via a fourth resistor; the collector is connected to the base of the PNP bipolar junction transistor via a fifth resistor; and the emitter is connected to the reference voltage terminal.

8. A bridgeless APFC according to claim 1, wherein the first/second input voltage polarity detector and the first/second low frequency switch driver are implemented with either discrete components or integrated circuits.

9. A bridgeless APFC according to claim 1, wherein the core(s) and winding(s) of the boost inductor is (are) lumped together either on one path between the first input voltage terminal and the first connecting node or on another path between the second input voltage terminal and the second connecting node, or is (are) distributed apart over both paths.

* * * * *